United States Patent
Ohmi

[11] 4,423,666
[45] Jan. 3, 1984

[54] BRAKE BOOSTER

[75] Inventor: Atsushi Ohmi, Anjo, Japan

[73] Assignee: Aisin Seiki Kabushiki Kaisha, Kariya, Japan

[21] Appl. No.: 411,040

[22] Filed: Aug. 24, 1982

Related U.S. Application Data

[63] Continuation of Ser. No. 145,692, May 1, 1980, abandoned.

[30] Foreign Application Priority Data

May 28, 1979 [JP] Japan .............................. 54-065812

[51] Int. Cl.³ .............................................. F16J 15/18
[52] U.S. Cl. ........................................ 92/168; 60/594; 277/143
[58] Field of Search ..................... 60/593, 594, 547 R; 92/168, 129; 277/143

[56] References Cited

U.S. PATENT DOCUMENTS

| | | | |
|---|---|---|---|
| 3,178,191 | 4/1965 | Dodd | 277/138 |
| 3,279,327 | 10/1966 | French | 92/168 |
| 3,410,179 | 11/1968 | Kytta | 92/168 |
| 3,678,687 | 7/1972 | Watabe | 60/593 |
| 3,699,680 | 10/1972 | Shellhause | 60/547 |
| 3,724,211 | 4/1973 | Julow | 92/168 |
| 4,274,258 | 6/1981 | Shirai | 92/168 |

FOREIGN PATENT DOCUMENTS 2139508 2/1972 Fed. Rep. of Germany ........ 92/168

Primary Examiner—Abraham Hershkovitz
Attorney, Agent, or Firm—Oblon, Fisher, Spivak, McClelland & Maier

[57] ABSTRACT

A brake booster for automotive vehicles in which a seal is employed for assuring hermetic connection between an output rod and a housing having a cup-shaped portion. The seal includes an annular sealing member through which the output rod is passed slidably and hermetically and a retainer for positively supporting the sealing member. The retainer is provided with a plurality of hooks to engage the cup-shaped portion so that the annular sealing member will be brought at a bead portion thereof to hermetic abutment against the housing.

3 Claims, 4 Drawing Figures

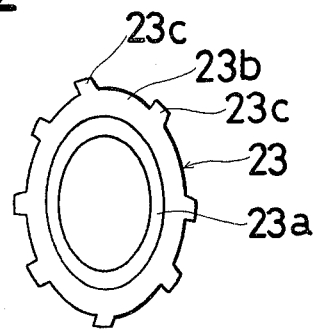
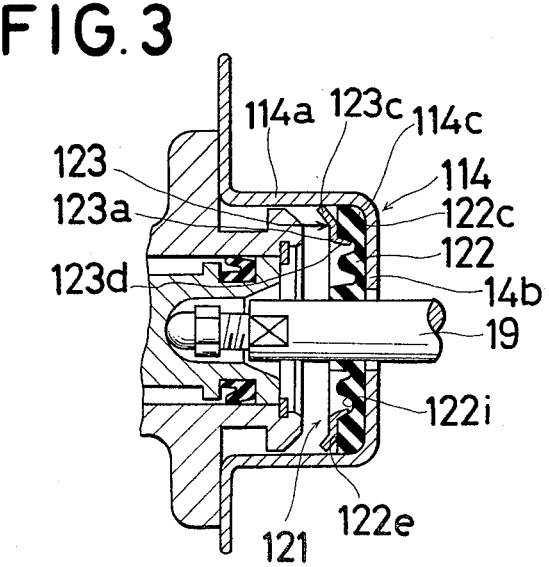
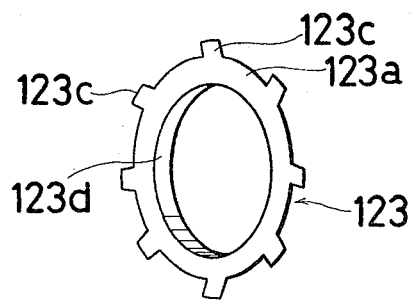

BRAKE BOOSTER

This is a continuation of application Ser. No. 145,692, filed May 1, 1980, now abandoned.

BACKGROUND OF THE INVENTION

1. Field of the Invention

This invention relates to a brake booster for automotive vehicles and more particularly to seal means for assuring an air-tight connection between a housing and an output rod of the brake booster.

2. Description of the Prior Art

The conventional brake booster has a housing constituted by coupling a front shell and a rear shell, and the front shell is provided at a central portion thereof with a cup-shaped portion so as to receive a rear end portion of a brake master cylinder. The cup-shaped portion is formed with a base wall having a hole through which an output rod is passed and an annular wall continuous to the base wall. In order to keep a hermetic connection between the output rod and the cup-shaped portion, there is hermetically inserted an annular sealing member in the cup-shaped portion, and a retainer is further inserted in the cup-shaped portion for preventing removal of the sealing member from the cup-shaped portion. In detail, an inner periphery of the sealing member slidably and hermetically contacts an outer surface of the output rod while an outer periphery of the sealing member hermetically contacts an annular wall of the cup-shaped portion. The sealing member is provided with one side adjacent to the base wall of the cup-shaped portion and the other side pressed by the retainer.

However, a hermetic connection between the annular wall of the cup-shaped portion and the outer periphery of the sealing member is likely to be loosened with running reciprocations of the output rod. In detail, the inner periphery of the sealing member may be followed to the output rod to some extent due to frictional force therebetween upon axial movement of the output rod, so that the outer periphery of the sealing member is gradually moved radially inwardly since the sealing member is not positively supported by the retainer. Consequently, a hermetic connection between the housing and the output rod fails in a resulting fatal defect of the function of the brake booster.

SUMMARY OF THE INVENTION

It is, therefore, one of the objects of this invention to provide a brake booster without the difficulties mentioned above.

It is another object of this invention to provide a brake booster in which a hermetic connection may be assured between the housing and the output rod thereof.

It is a further object of this invention to provide a brake booster in which an outer periphery of a sealing member is entirely in hermetic contact with a cup-shaped portion of a housing.

It is a still another object of this invention to provide a brake booster in which a sealing member is positively supported by a retainer for assuring hermetic contact between the sealing member and the cup-shaped portion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 2 is a perspective view of a retainer employed in a brake booster in FIG. 1, FIG. 3 is a view similar to FIG. 1 but showing another embodiment of this invention, and FIG. 4 is the perspective view of a retainer employed in a brake booster of FIG. 3.

DETAILED DESCRIPTION OF THE PREFERRED EMBODIMENTS

Figure 1:
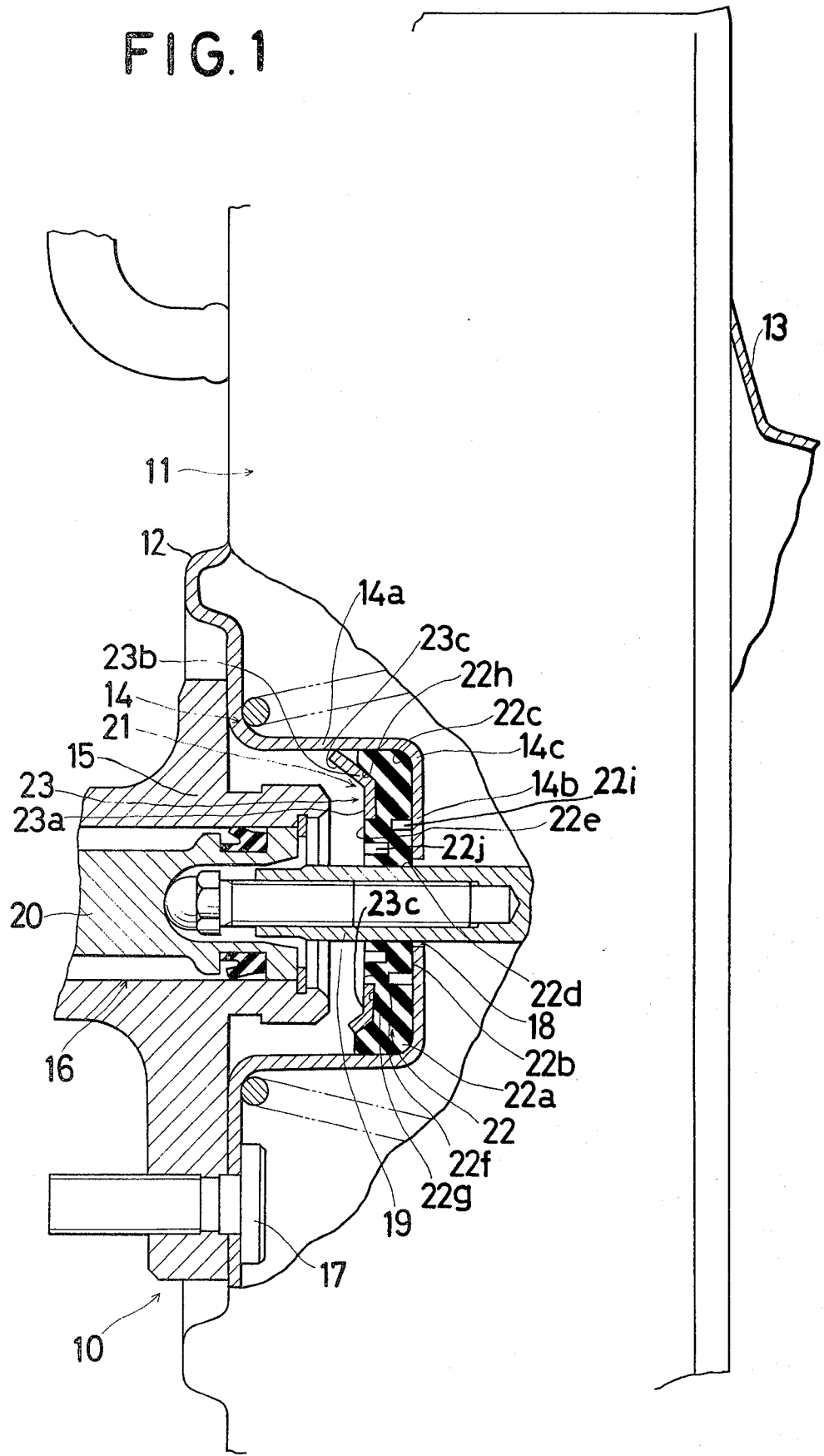
FIG. 1 is a fragmentary cross-sectional view of a brake booster according to the invention.

Referring now to FIG. 1, there is illustrated a brake booster 10 having a housing 11 which is formed by coupling a front shell 12 and a rear shell 13 in a well-known manner. The front shell 12 is provided at a central portion thereof with a cup-shaped portion 14 so as to receive a rear end portion 15 of a master cylinder 16 which is secured to the front shell 12 by a plurality of bolts 17.

The cup-shaped portion 14 is composed of an annular wall 14a, a base wall 14b and a rounded boundary portion 14c between two last named members 14a and 14b. The base wall 14b has formed therein hole 18 through which an output rod 19 is passed for transmitting force to a piston 20 of the master cylinder 16.

Numeral 21 denotes a seal for assuring a hermetic connection between the housing 11 and the output rod 19 and including an annular sealing member 22 and a retainer 23. The sealing member 22, made of a resilient substance such as synthetic rubber, is fitted into the cup-shaped portion 14 and is brought into abutment against the base wall 14b of the cup-shaped portion 14. In detail, an outer periphery 22a, right side 22b, and a bead portion 22c formed by rounding a boundary portion between the outer periphery 22a and the right side 22b of the sealing member 22 are respectively in hermetic contact with the annular wall 14a, the base wall 14b and the rounded boundary portion 14c with right side 22b having a circumferential groove 22i formed therein. The sealing member 22 is passed through by the output rod 19, an outer surface of which slidably and hermetically contacts an inner periphery 22d of the sealing member 22. The sealing member 22 is provided at left side 22e thereof with a projection 22f, circumferential groove 22j formed in left side 22e, a flat portion 22g parallel to the base wall 14b and a coned surface 22h.

The retainer 23 includes an annular portion 23a parallel to the base wall 14b, a coned portion 23b formed integrally with the annular portion 23a and embedded within said sealing member 22 so as to have an exposed surface 23c that is flush with said left side 22e, and a plurarity of projections or hooks 23c projecting from the coned portion 23b. The hooks 23c are in engagement with the annular wall 14a so as to prevent removal of the sealing member 22 from the cup-shaped portion 14. The annular portion 23a prevents the sealing member 22 from axial movement and deformation thereof in cooperation with the base wall 14b of the cup-shaped portion 14. The coned portion 23b of the retainer 23 is in snug contact with the coned surface 22h of the sealing member 22 for positive support thereof at an angle with respect to the axis of the sealing member. Thus, the bead portion 22c of the sealing member 22 is in hermetic contact with the rounded boundary portion 14c of the cup-shaped portion 14 and hermetic contact therebetween is assured in spite of the follow of the inner periphery 22d with the output rod 19 due to the frictional force upon axial movement of the output rod 19. Therefore, hermetic contact between the cup-shaped portion 14 and the output rod may be assured.

Next referring to FIGS. 3 and 4, there is illustrated another embodiment of this invention wherein a seal 121 includes an annular sealing member 122 and a retainer 123. The sealing member 122 is provided at the left side 122e thereof with an annular groove 122i. The retainer 123 includes an annular portion 123a parallel to the base wall 114b of the cup-shaped portion and snugly contacting the left side 122e of the sealing member 122, a plurality of hooks 123c formed integrally with an outer periphery of the annular portion 123a and engaging with the annular wall 114a of the cup-shaped portion 114, and a cylindrical portion 123d fitting into the groove 122i. Thus, the sealing member 122 is supported positively radially outwardly as well as axially, and the bead portion 122c of the sealing member 122 is in hermetic contact with the rounded boundary portion 114c of the cup-shaped portion 114. Therefore, hermetic connection between the housing 11 and the output rod 19 is assured.

As mentioned above, according to the invention, hermetic contact between the bead portion of the sealing member and the rounded boundary portion is kept by positive support by the retainer in spite of the deformation of the inner portion of the sealing member upon axial movement of the output rod, so that hermetic connection between the housing and the output rod will be assured.

Obviously, numerous modifications and variations of the present invention are possible in light of the above teachings. It is therefore to be understood that within the scope of the appended claims, the invention may be practiced otherwise than as specifically described herein.

What is claimed is:

1. A brake booster for automotive vehicles comprising:

a housing including a shell;

a cup-shaped portion provided at a central portion of said shell integrally therewith and having an annular wall, a base wall, and a rounded boundary portion formed therebetween such that said annular wall, said base wall and said rounded boundary portion form a substantially continuous cup-shaped portion;

an annular sealing member having an axis and positioned in an interior portion of said cup-shaped portion and within an interior portion of said shell and abutting against said base wall along a first side of said sealing member;

said sealing member having along said first side a first circumferential groove and an annular bead portion at an outer periphery thereof in sequential order radially outwardly;

an output rod extending from an interior portion of said housing for actuating a master cylinder and passing hermetically and slidably through said sealing member;

a single retainer disposed adjacent to a second side of said sealing member located opposite said first side and including an annular portion of said single retainer parallel with said base wall and in snug contact with an annular flat side face of said sealing member, a coned portion positively supporting said bead portion radially from an inner side of said bead portion for establishing continuous intimate contact between said rounded boundary portion and said bead portion such that said single retainer and said sealing member exclusively establish said continuous and intimate contact, and a plurality of securing hooks radially projecting from said coned portion of said single retainer for fixedly engaging said annular wall wherein said coned portion positively supporting said bead portion further comprises means for positively supporting said sealing member at an angle with respect to said axis and wherein said sealing member includes at said second side thereof a second circumferential groove, a projection extending therefrom, a flat portion, and a coned surface in sequential order radially outwardly, said coned portion snugly contacting said coned surface of said sealing member.

2. A brake booster in accordance with claim 1, wherein an exposed surface of said annular portion of said single retainer is flush with an exposed surface of said second side of said sealing member.

3. A brake booster for automotive vehicles comprising:

a housing including a shell;

a cup-shaped portion provided at a central portion of said shell integrally therewith and having an annular wall, a base wall, and a rounded boundary portion formed therebetween such that said annular wall, said base wall and said rounded boundary portion form a substantially continuous cup-shaped portion;

an annular sealing member having an axis and positioned in an interior portion of said cup-shaped portion and within an interior portion of said shell and abutting against said base wall along a first side of said sealing member;

said sealing member having an annular bead portion at an outer periphery thereof;

an output rod extending from an interior portion of said housing for actuating a master cylinder and passing hermetically and slidably through said sealing member;

a single retainer disposed adjacent to a second side of said sealing member and including a plurality of securing hooks engaged with said annular wall, an annular portion of said single retainer being parallel with said base wall and in snug contact with an annular flat side face of said sealing member, and having a portion positively supporting said bead portion radially from an inner side of said bead portion for establishing continuous intimate contact between said rounded boundary portion and said bead portion such that said single retainer and said sealing member exclusively establish said continuous and intimate contact, said portion positively supporting said bead portion further comprising means for supporting positively said sealing member at an angle with respect to said axis and wherein said sealing member is provided at said second side thereof with a projection, a flat portion, and a coned surface in sequential order radially outwardly, said annular portion of said retainer further comprising a coned portion snugly contacting said coned surface of said sealing member and said plurality of hooks projecting from said coned portion of said retainer.

* * * * *